United States Patent [19]
Ranger et al.

[11] 3,915,490
[45] Oct. 28, 1975

[54] RESILIENT RAILWAY WHEEL

[75] Inventors: Erich Ranger, Aalen; Josef Berg, Heidelberg, both of Germany

[73] Assignee: Schwabische Huttenwerke Gesellschaft mit beschrankter Haftung, Wasseralfingen, Germany

[22] Filed: Feb. 8, 1974

[21] Appl. No.: 440,766

[30] Foreign Application Priority Data
Feb. 10, 1973 Germany.............................. 2306650

[52] U.S. Cl. ...................... 295/21; 295/15; 295/17; 295/23
[51] Int. Cl.$^2$.. B60B 3/04; B60B 3/08; B60B 17/00; B60B 21/10
[58] Field of Search .............. 29/168; 295/1, 21, 22, 295/23, 15, 16, 17, 18, 19, 20, 24

[56] References Cited
UNITED STATES PATENTS

| | | | |
|---|---|---|---|
| 99,210 | 1/1970 | Komp | 295/22 |
| 120,432 | 10/1871 | Handyside | 295/22 X |
| 350,133 | 10/1886 | Hill | 295/22 |
| 1,745,153 | 1/1930 | Dalton | 295/22 X |
| 3,127,212 | 3/1964 | Eklund | 295/21 |

FOREIGN PATENTS OR APPLICATIONS

| | | | |
|---|---|---|---|
| 325,247 | 2/1930 | United Kingdom | 295/22 |
| 608,627 | 9/1948 | United Kingdom | 295/21 |

*Primary Examiner*—M. Henson Wood, Jr.
*Assistant Examiner*—Howard Beltran
*Attorney, Agent, or Firm*—Walter Becker

[57] ABSTRACT

A light weight wheel, especially for a rail vehicle and a method of making in which at least one disc of high strength resilient metal, steel, for example, is formed by rolling or spinning to vary the thickness thereof in respective annular regions. At least the outer margin of the disc is formed to a sleeve shape which fits inside an annular wheel rim and is connected thereto by forming the sleeve radially outwardly into undulations formed in the inside of the rim. The inner margin of the disc can be formed to a sleeve shape and be connected to a hub in the same way the outer margin is connected to the rim or, the inner margin may, itself, form the hub. The disc undulates, or inclines, in the radial direction for resilient support of the rim. A single disc can be used or two discs can be used in side by side relation for a wheel.

9 Claims, 3 Drawing Figures

RESILIENT RAILWAY WHEEL

The present invention relates to a light wheel set for rail vehicles which is provided with wheel discs mounted on an axle shaft while each of said wheel discs has at least one disc plate which is connected to the hub or axle on one hand and to the rim or ring on the other hand.

Light wheel sets have reached a state of development which is characterized by the employment of hollow axles and of thin walled wheel discs which in view of a part that in radial section represents an undulation, or by a double undulation arranged perpendicularly with regard to each other has a sufficient or excellent rigidity. Fundamentally, the hollow axles and also the light wheel discs made of one piece are, starting from raw forged structural elements, deformed and on all sides machined by chip removal. With these manufacturing mounts, already approximately 30 years ago, an absolute safety of operation and a satisfactory reduction in weight has been obtained while the obtained elasticity and the economically tolerable manufacturing costs were less satisfactory. The tendency to increase the driving speed has made it desirable and necessary further to reduce the weight and to increase the elasticity or resilience of the wheel discs. Various suggestions have been made in this direction which, however, have not been adopted in practice. The reason for not attempting these suggestions in practice consists in that these constructions do not yield sufficient safety of operation, or the reduction in weight and the increase in resilience were out of line with the manufacturing costs.

For instance, wheel sets have been suggested which are not made of one piece but were made of a hub portion, a rim or ring portion, and a disc plate interconnecting the same. Also wheel discs have been suggested which have a plurality of disc plates. These constructions, however, have never reached a stage beyond insignificant tests of operation. They were rejected in view of unsatisfactory endurance strength of the connections between the disc plate with hub or rim and also in view of too low a resilience and furthermore in view of too high manufacturing costs.

In the effort of industry to arrive at lighter and more resilient wheel discs, the heretofore customary manufacturing methods were employed namely heat forming of forged raw structural members, hot flanging of the undulation, chip removal machining, pressing on operations, shrink fitting, wedging-over operations and possibly also welding. Apparently, the initially described light wheel set construction represents the optimum that was obtainable with the heretofore known customary manufacturing methods used in connection with the manufacturing of light wheel sets for rail vehicles further in a satisfactory manner to reduce the weight and to increase the resilience of wheel discs while reducing the manufacturing costs and while assuring under all conditions a high safety of operation.

These and other objects and advantages of the invention will appear more clearly from the following specification in connection with the accompanying drawings, in which.

Figure 1:
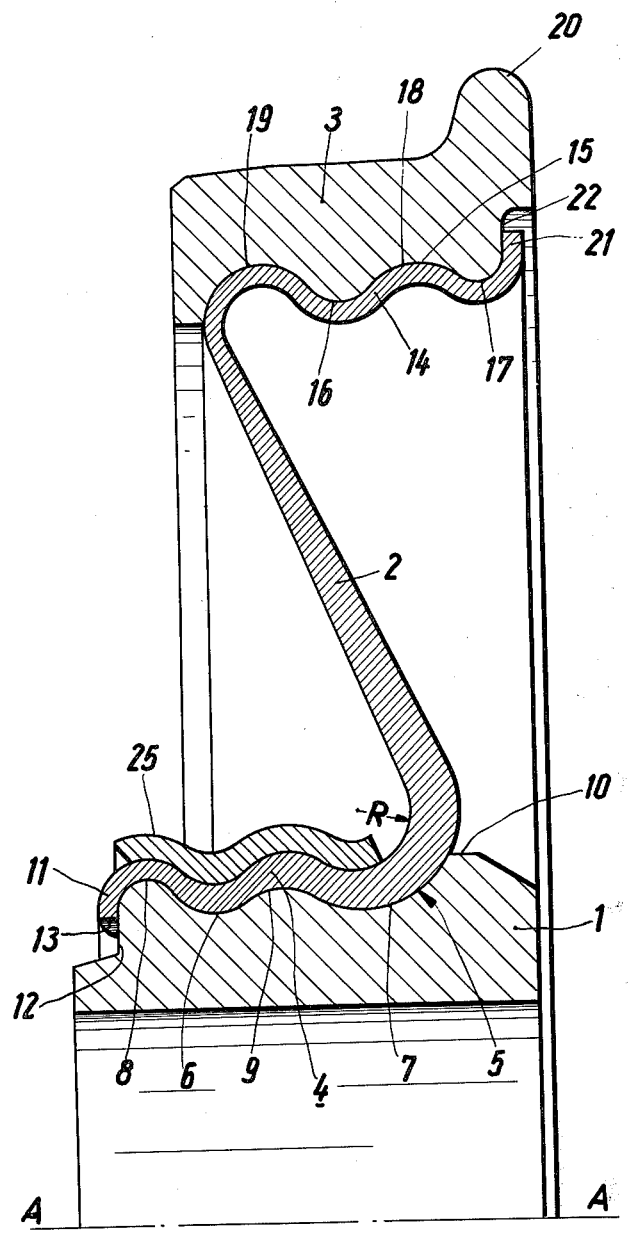
FIG. 1 represents a portion of an axial section through a wheel according to the invention for a rail vehicle.

The light wheel set according to the present invention which has at least one wheel plate connected to the hub or wheel axle on one hand and to the rim or ring on the other hand is characterized primarily in that the disc plates are formed by cold forming flow pressing, in particular by means of rollers and/or rolls in those parts which in radial section form an undulation and/or in their wall thicknesses which in radial direction vary alternately and/or in their connecting ranges to the other wheel disc parts and/or in their engagement with an engaging pressure taking advantage of the material stretching limit of the disc plate and directed against the wheel disc parts connected to the disc plates while the material is highly consolidated or strengthened and while a high surface pressure preload and a high surface quality is realized.

The forming-flow pressing is a chipless forming operation according to which by means of considerable material displacement in the workpiece being formed, as they are not obtainable by pressing deep-drawing rolling, roller pressing or edging, a freely formed workpiece can be produced from a simple formed raw workpiece which greatly varies as to different wall thicknesses. With these considerable displacements of material in the workpiece being formed, simultaneously a high strengthening of the material, high surface pressure preload and high surface quality will be realized.

With workpieces having the shape of a body of revolution as is the case for instance with wheel discs, the cold forming flowing pressing is from a certain diameter carried out by means of roller and/or rollers. The material can from one zone to another zone of the wheel disc be displaced to such an extent as it is not obtainable by customary rolling of wheel discs for rail vehicles. Thus, by displacement of material, it is possible for instance to shape partial zones of the disc plates as to their wall thickness considerably thicker than the original wall thickness in the corresponding partial zone of the raw structural element from which the disc is being shaped.

In view of the possibility of realizing considerable displacement of material, it is possible by cold forming flowing pressing to undulate the wheel disc stronger and with greater majority than was heretofore possible with the customary manufacturing methods for wheel discs for rail vehicles. For instance according to the present invention it is possible to realize a deeper undulation, a greater number of undulations, a greater inclination of the shaft flanks with regard to the wheel plane, and smaller bending-off radii. The wall thickness may be adapted to the specific strength requirements of each zone, for instance a zone with a short bending-up radius, in such a way that a wheel disc will be obtained which in all zones withstands the same high specific material stresses.

The rim zones of the wheel plates may be made by cold forming flow pressing with adapted wall thicknesses and while being located in axial direction in the manner of a collar, in such a way as to make possible permanent connections, which are adapted to withstanding high loads, with the hub or axle on one hand and/or with the rim or ring on the other hand. These collars may be cold forming flow pressing be pressed against the countersurfaces at a pressure taking full advantage of the elastic limit of the disc plate so that a maximum frictional power transfer will be realized. The individual zones of the coller may additionally be formed on in one or more recesses located in circumferential direction so that additionally a frictional connection in axial direction will be obtained.

In constrast to customary shrink fitting or pressing-on operations, almost any desired wide positive engagement surface perpendicular or inclined to the wheel set axis and extending in circumferential direction against a one-piece counter-engaging surface may be realized without impairing the exploitation of the elastic limit for the engaging pressure. With a customary pressingon onto a positive set, due to the elastic widening when slipping over the greater diameter for spring-in onto the recess, the exploitation of the elastic limit is lost to a major extent. If, when employing steel ($E = 2.1 \times 10^6$) with an elastic limit of for instance 50 kp per square mm, the difference between the greater diameter and the base diameter of the recess is greater than 1/420 of the greater diameter, it will be appreciated that in conformity with Hooke's law for the elastic windening when slipping over the greater diameter, the elastic limit is fully required so that after the spring-in into the recess, no engaging pressure prevails any longer.

The exploitation of the elastic limit for the engaging pressure can additionally be increased to a considerable extent when the recesses are provided with inclined flanks and when the engagement at the bottom of the recesses is omitted. In such circumstances, the individual zones of the collar which are formed onto the recesses can be brought to engage the inclined flanks in a wedge-shaped manner with the full elasticity of the material.

According to a preferred embodiment of the invention, the counterengaging surface for the inner end or outer marginal zone of the disc plate has in its axial longitudinal section located in the axis of rotation an undulated profile.

According to a further development of the invention, the axle shaft may be designed as a thin-walled hollow axle, and may obtain its profile during the rolling on of the inner marginal zone of the disc plate and their counterengaging surfaces there may be provided at least one metallic or non-metallic intermediate layer for avoiding or reducing fretting corrosion (Passungsrost). Furthermore between the marginal zones of the disc plate and its counterengaging surfaces, adhesive or solder connections may be provided. With a preferred embodiment of the invention, it is provided that the edges of the marginal zone of the disc plate additionally have a welding connection with counterengaging surfaces on their end edges.

With a light wheel set according to the present invention, each of the wheels pertaining to a wheel set may include disc plates which are axially spaced from each other and of which one is formed on in the above mentioned manner on its outer marginal zone by cold forming flow pressing onto the bore of the wheel rim which bore has at least one recess, and by means of the end section of the outer marginal zone is rolled over the rim of the second disc plate while embracing the rim of the second disc plate at high engaging pressure.

Referring now to the drawing in detail, the wheel illustrated therein pertains to a non-illustrated light wheel set for rail vehicles and has a wheel hub, 1, mounted on a non-illustrated axle, a disc plate 2, and a wheel rim or ring 3. The disc plate 2 is made of sheet metal having an elastic limit of 50 kp per square mm. The disc plate 2 has a shape which above all is resilient in axial direction and is produced by cold-form flowing rolling. In axial longitudinal section, the said disc plate 2 has when looking at FIG. 1 an inverted "Z" shape. At its inner marginal zone 4 the disc plate is positively and frictionally connected to the wheel hub 1. To this end, the inner marginal zone 4 is by cold-forming flow rolling or milling formed into an axially extending collar and is formed onto a counterengaging surface 5 at the circumference of the wheel hub which latter is designed as surface of rotation which is coaxial with the axis of rotation of the wheel 12 is indicated by line A—A. For purposes of obtaining an axial positive connection, the counterengaging surface 5 has two curved recesses 6, 7 which are spaced from each other in axial direction of the wheel and which are preceded and followed respectively by sections 8 of larger diameter than that of the sections 6 and 7. The strong positive connection of the cross-sectional profile of the wheel hub 1 has a pronounced undulated character while the difference in diameter at the two recesses 6 and 7 with regard to the remaining sections amount to considerably more than 1/420 of the greater diameter. The pressure per unit of area of the collar 4 relative to the counterengaging surface 5 makes full use of the elastic limit of the employed material.

For further increasing the connection of the collar relative to the counterengaging surface 5, the end section 11 of the collar is up to its engagement with an end shoulder 12, which extends in a direction transverse to the axis A—A, rolled inwardly and pulled in and is additionally connected by welding 13 to the shoulder 5. At the other axial end section 11 of the hub, the disc plate 2 extends at a relatively short bending radius R out of the counterbearing surface 5. Inasmuch as in this area of the plate 2 the bending stresses are particularly high, it will be appreciated that as will be evident from FIG. 1, for purposes of increasing the wall thickness, more material has been rolled onto this portion of plate 2 than on other portions. The wall thickness of the disc plate gradually decreases from said last mentioned area toward the outer marginal zone 14 and, also within the region of the collar 4, the wall thickness decreases toward the rolled over end section 11.

For purposes of establishing a positive connection with the rim or ring 3, the outer marginal zone 14 is by cold forming flow pressing formed against the recesses 15 of the wheel rim, said bore 15 likewise having an undulated axial profile. The bore 15 which is likewise designed as the surface of rotation has two beads 16 and 17 which have a considerable shorter free diameter than the recesses 18 and 19 adjacent thereto. Also in this instance the differences in diameters exceed 1/420 of the greater diameter so that when carrying out the forming-on operation, in addition to the frictional connection also a strong positive connection is realized. Within the region of the rim portion 20, the end section 21 of the outer marginal zone 14 is for purposes of increasing the positive connection rolled over against a set-back shoulder surface 22.

With the embodiment illustrated in FIG. 1, it will be appreciated that for further increasing the tension forces securing the connection between the collar 4 and the hub 1 there is provided an additional profile ring 25 which overlaps the collar 4 and the hub 1 over a major portion of its axial extension and is likewise by cold forming flowing pressing braced against the collar 4 in such a way that the elastic limit of the material is taken advantage of to an optimum extent.

Figure 2:
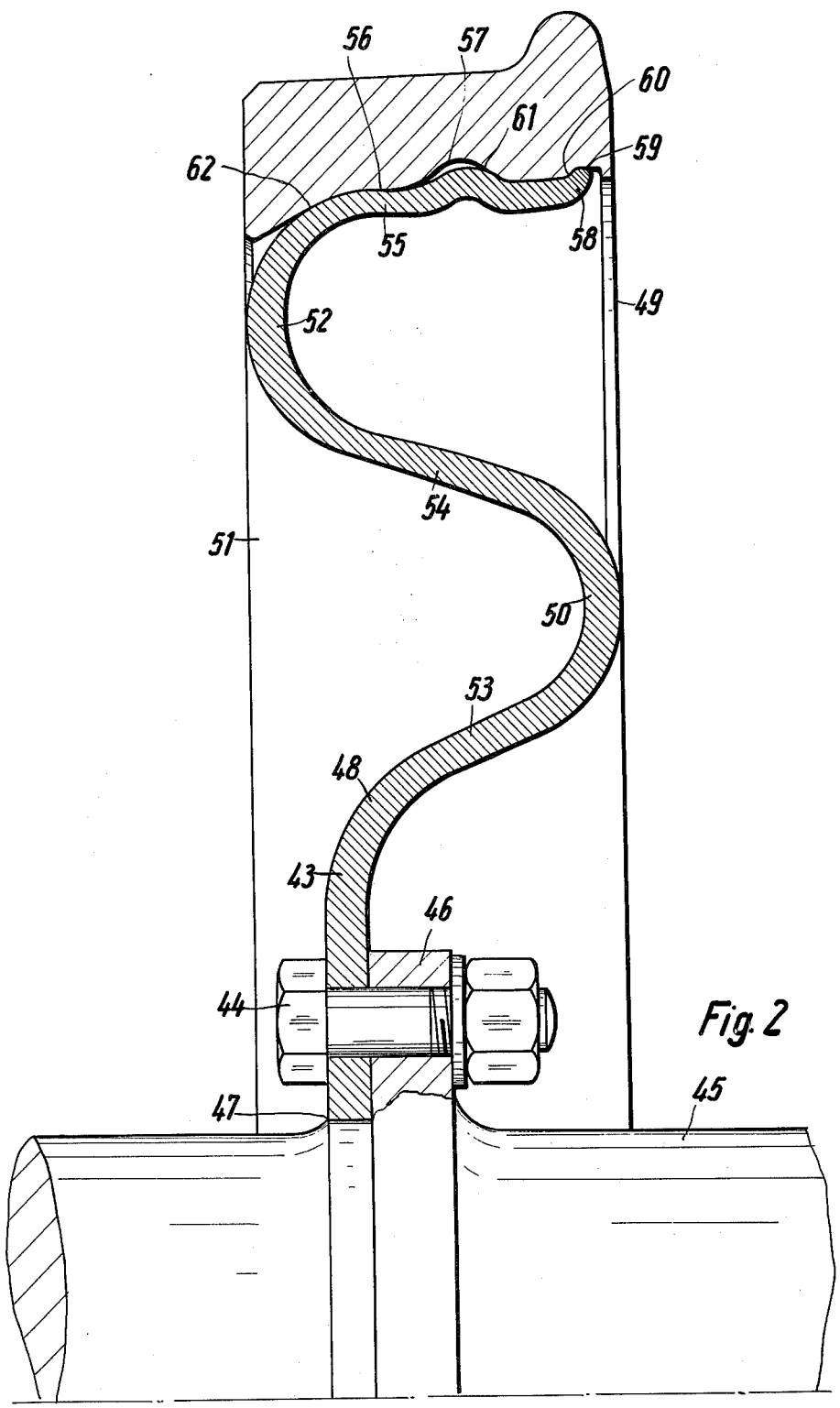
FIG. 2 shows a modified wheel according to the invention of a particularly strongly resilient form.

FIG. 2 shows an embodiment of the invention according to which the disc plate 43 has a shape which in axial and radial direction is particularly strongly resilient. The plate 43 is by screws to the flange 46 forged to the axle 45. The plate 43 is mounted on the centering part 47 by press fit in order to assure a safe holding and guiding. Near the area where the disc plate 43 leaves the flange region it has a well-rounded but strong bent off section 48 bent off toward the interior of the wheel. This bent off section 48 has been obtained by cold forming flow pressing. Within the region of the interior end plane 49 of the one end face of the wheel there is provided a similarly well-rounded strong bent-off section 50 which is bent off toward the outside of the outer wheel end face plane 51. Within the region of the outer wheel end face plane 51 there is a similar bent-off section 52 bent off in the opposite direction. In veiw of these various bent off sections, the disc plate 43 has a shape which is greatly resilient in axial and radial direction. During the cold forming flow pressing of this form, the disc plate 43 also has received a high consolidation and strengthening of the material, a high surface pressure prelaad and a high surface quality. Furthermore, in view of the cold forming flow pressure, the wall thicknesses of plate 43 within the particularly stressed curved sections 48, 50 and 52 have been formed out thicker than with the less stressed and not so strongly curved intermediate ranges 53 and 54. The intermediate ranges 53 and 54 are inclined to the wheel plane by an angle of approximately from 60°–80°.

Adjacent the bent over section 52, the disc plate merges with a formed-on collar 55 which extends approximately in axial direction of the wheel. This collar has a slightly conical outer mantle surface 56 by means of which it is axially pressed into a similarly slightly conical wheel bore whereby, with this embodiment, the engaging pressure was generated between the collar of the disc plate 43 and the wheel rim which engaging pressure takes optimum advantage of the elastic limit. Adjacent thereto, a section of the collar was by cold forming flow rolling, or milling or also by a radial pressing extending simultaneously over the entire circumference of said last mentioned section pressed into the recess 57 which recess is designed as a surfave of revolution. Similarly, the marginal region 58 of the collar is formed into the recess 59. In the recess 57 the said section of the collar is not formed quite up to the bottom of the recess. The forming in by rolling, milling or radial pressing generates, however, a high engaging pressure at the flank 60 and 61 of the recesses, said engaging pressure working in the manner of a wedge. The flanks of the recesses and of the curved conical section 62 of the collar create a multiple positive connection in both axial directions which connection additionally secures the rim fit.

The embodiment of FIG. 2 represents only one of a plurality of possible variants of this type. For instance the disc plate may be bent off more or less strongly or more or less frequently. The bent off portions may for instance also be designed as an image to the illustration of FIG. 2.

Furthermore, the disc plate may within the region of the axle also be differently connected for instance may be screwed to a hub, may be welded or may be connected positively or by friction.

Figure 3:
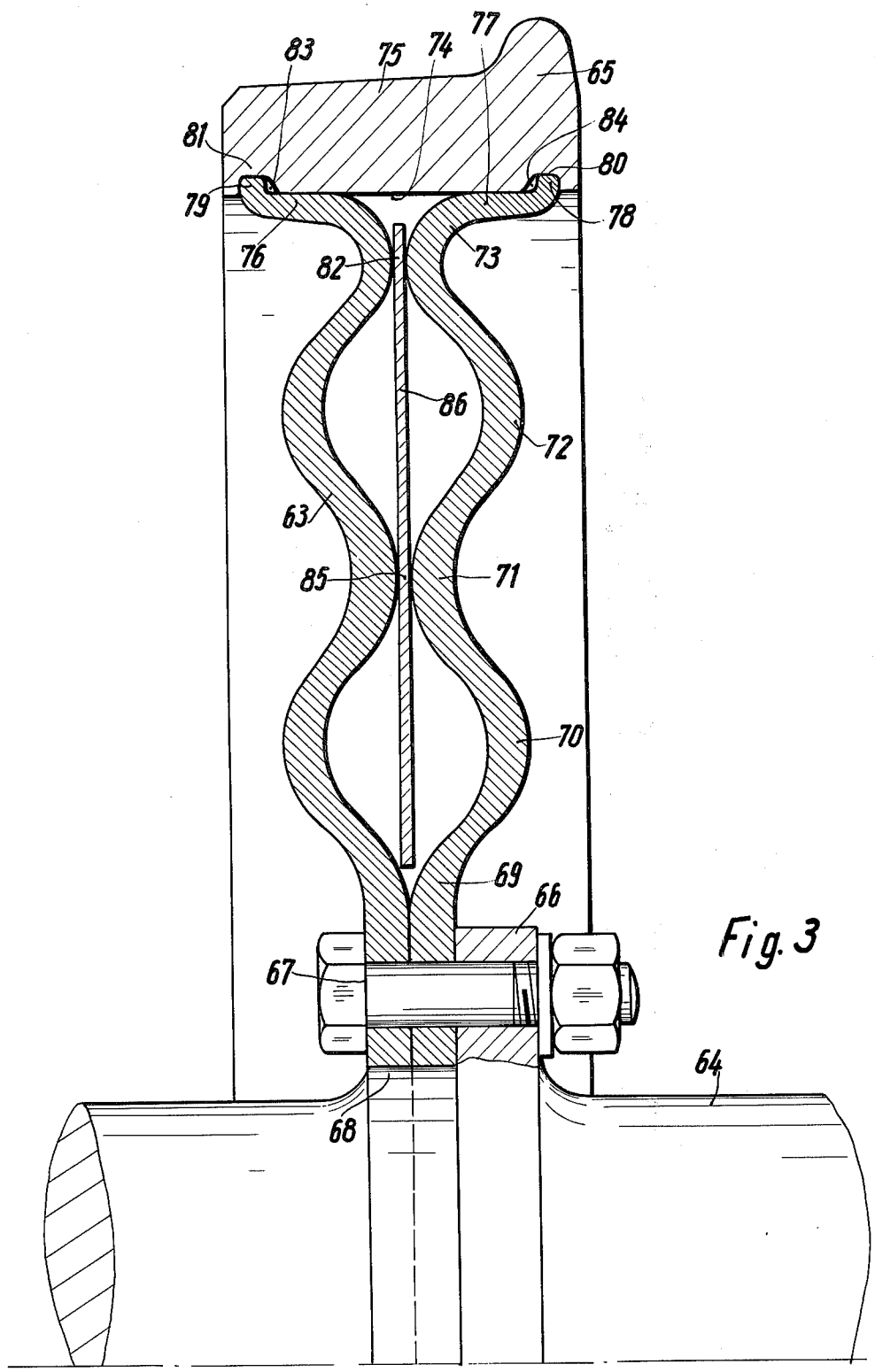
FIG. 3 represents a section through a portion of still another embodiment of a wheel according to the present invention which differs from the wheels of FIGS. 1 and 2, particularly in the employment of a double disc.

FIG. 3 illustrates a further embodiment of the invention. According to this embodiment, the two disc plates 62 and 63 connect the axle 64 to the wheel rim 65. The two disc plates 62 and 63 are by means of screws 67 connected to the forged-on flange 66. In this embodiment the two disc plates are not centered on the cylindrical seat 68 but have play with regard to the seat. For purposes of centering the disc plates on the axle, all or at least two of the screws 67 are designed as fitting screws. The two disc plates are by means of the bent-off portion 69, 70, 71, 72 and 73 undulated a plurality of times in order to assure a sufficient radial spring. For a sufficient endurance, the strongly curved bent-off portions 69–73 are designed thicker than the intermediate sections. Theaarrangement of the two disc plates in parallel and mutually engaging position brings about the desired great stiffness against inclination of the wheel plane relative to its rated position perpendicularly with regard to the wheel axle without decreasing the desired magnitude of the lateral spring on the wheel rail contact point (Radaufstandspunkt) which lateral spring is now effected to a major extent by a parallel displacement of the wheel body.

The bore 74 of the wheel rim 75 is practically designed cylindrical. The engagement regions 76 and 77 of the disc plates in the bore of the wheel rim are approximately conical and as to diameter are so designed that when the wheel rim is pressed into the bore, they will assure the desired tight fit of the wheel rim. The rim ranges 78 and 79 of the engaging sections are so formed onto the recesses 80 and 81 that the two disc plates are at the contact area 82 exerting great mutual pressures upon each other. Due to the marginal regions formed onto the recesses, the wheel rim guide fit would be reinforced by an additional positive connection in axial direction. The remaining hollow spaces 83 and 84 make possible a particularly high engaging pressure at the contacting area 82 and also make possible a particularly strong preloaded axial positive connection. In order to avoid fretting corrosion and weat at the connecting areas 82 and 85, there is inserted an intermediate layer 86. This layer is possibly so designed that it simultaneously establishes an adhesive or solderlike connection between two of the disc plates.

In addition to this embodiment, numerous further variations are possible which are similar in principle but different in construction.

The forming-in of the inner and/or outer marginal zone of the disc plate 2 may be obtained not only by cold forming flow rolling but also by radial and pressing-in operations which extend the entire circumference of the marginal zone and by deforming flow in the material inherent thereto, similar to the forming of crown closures on bottle heads or similar to the pressing in of guiding rings into annular grooves of artillery projectiles. Such pressing-in appears to be particularly advantageous when small hollow spaces are left at the bottom of the recesses, which spaces during the forming-on of the marginal zones are not completely filled in so that the highly desired surface pressure will be increased by a wedge-like engagement at the flanks of the recesses.

For purposes of increasing the fixed connection of the disc plate with the jub and the rim, the following features are of importance which may be employed in the just described embodiment:

1. The elastic limit of the materials in the marginal zones of the disc plate is taken advantage of to a maximum extent.
2. Inherent thereto a surface pressure is obtained in the connecting zone which takes advantage of the elastic limit to a maximum.
3. In view of the greater differences in the diameter, greater engaging and wear surfaces as well as wear volumina are obtained in the axial positive connection of the connection after a possible loosening will assure good emergency running properties.
4. For purposes of obtaining an optimum positive connection, no expensive and multi-sectional design of the counterengaging surface is necessary which would be liable to disturbances.
5. In each of the two axial directions there are provided at least two positive engaging surfaces for each connection.
6. When forming on the marginal zones in the positive connection in the described manner by means of rollers, rolls or radial pressing, a hollow space may remain in the bottom of the recesses which will make possible a wedge-like engagement in the flanks of the recesses and an increased engaging pressure.

In view of the advantages secured by the above mentioned features, with regard to a better and standing up connection of the disc plate with the hub and the rim, a considerably increased resilience of the disc plate is obtained with a wheel set according to the invention while this increase resilience is realized and advanced by the following features:

1. A multiple and deeper undulation in the shape of the disc plate will be possible.
2. A far reaching adaptation of the wall thickness to the differently highly stressed zone of the disc plate, especially at the zones with smaller radii of curvature and deeper undulations will be realized.
3. A higher elasticity of the material in the disc plate will be obtained.
4. A greater endurance will be obtained by a groove-free surface at the same pressure preload.
5. A consolidation of the material and inherent thereto higher strength of the disc plate will be realized by cold forming flow pressing by means of rollers and/or rolls.

It is, of course, to be understood that the present invention is, by no means, limited to the particular showing in the drawings but also comprises any modifications within the scope of the appended claims.

What is claimed is:

1. A metal wheel, especially for a rail vehicle, comprising: a hub portion adapted for connection to an axle, a wheel rim surrounding said hub portion in concentric radially spaced and substantially coplanar relation thereto have an inner undulated surface, and disc-like plate means connected at the radially inner margin to said hub portion and at the radially outer margin to said wheel rim under preload therebetween, said plate means being cold formed and having variation in axial thickness in respective radial regions thereof, said plate means in the radial portion thereof between the radially inner and radially outer margins being undulated, said plate means being resilient in radial direction and in axial direction with variation in thickness thereof being provided in at least one location where undulated, at least said radially outer margin of said plate means being shaped to form an axial undulated sleeve concentric with said rim and disposed in mating relation with said inner undulated surface inside said rim, and interengaging surfaces formed on said sleeve and on the inner periphery of said rim fixedly interconnecting the rim with the sleeve.

2. A meatl wheel according to claim 1 in which said plate means in the radial portion thereof between the radial portion thereof between the radially inner and radially outer margins is at an inclined angle to the common axis of said hub portion and rim.

3. A metal wheel according to claim 1 in which the radially inner margin of said plate means is also shaped to form an axial sleeve which is concentric with said hub portion and which interfits with and is fixed to the outer periphery of said hub portion.

4. A metal wheel according to claim 3 in which at least one axial end of the sleeve of the plate means engaging said hub portion is welded to said hub portion.

5. A metal wheel according to claim 1 in which said sleeve and the inner periphery of said rim are gnenerally conical, the said interengaging surfaces of said sleeve and rim are undulating.

6. A metal wheel according to claim 5 in which the undulations of the sleeve do not bottom in the undulations in the rim.

7. A metal wheel according to claim 1 in which the hub portion has a radially outer surface which undulates in axial cross section, said radially inner margin of said plate means being in engagement with said undulations on the hub portion.

8. A metal wheel according to claim 7 which includes a ring surrounding the radially inner margin of said plate means and formed into the undulation thereof on the radially outer side to reinforce the connection of said plate means to said hub portion.

9. A metal wheel according to claim 1 in which said plate means comprises a pair of plates each having a plurality of undulations therein with the peaks and valleys of the undulations of one plate opposed to those in the other plate, and a metal disc element between said plates engaging and connected to at least the peaks of the undulations of said plates.

* * * * *